United States Patent [19]

Hamner et al.

[11] 3,961,036
[45] June 1, 1976

[54] ALUMINA SYNTHESIS

[75] Inventors: Glen P. Hamner; William J. Mattox, both of Baton Rouge, La.

[73] Assignee: Exxon Research and Engineering Company, Linden, N.J.

[22] Filed: Jan. 4, 1974

[21] Appl. No.: 430,776

[52] U.S. Cl............................... 423/628; 423/630; 252/442
[51] Int. Cl.$^2$........................................... C01F 7/02
[58] Field of Search ........... 423/625, 626, 628, 630; 252/442

[56] References Cited
UNITED STATES PATENTS

| | | | |
|---|---|---|---|
| 1,951,718 | 3/1934 | Ziese............................ | 423/630 UX |
| 2,479,110 | 8/1949 | Haensel ............................ | 208/139 |
| 2,642,384 | 6/1953 | Cox..................................... | 208/139 |
| 2,893,837 | 7/1959 | Kearby et al. ...................... | 423/626 |
| 2,914,488 | 11/1959 | Gilbert............................. | 423/628 X |

*Primary Examiner*—Herbert T. Carter
*Attorney, Agent, or Firm*—J. E. Luecke; J. Simon

[57] ABSTRACT

High surface area alumina materials, which are particularly effective catalyst supports or carriers, are prepared by heating alumina monohydrate, alumina trihydrate or mixtures thereof from 450°–500° to at least 800°F in the presence of excess elemental chlorine. The heating of the alumina material with elemental chlorine is conducted prior to said alumina material being heated to a temperature above about 450°–500°F in the absence of elemental chlorine. The alumina monohydrate or trihydrate compositions are derived from the aqueous phase reaction of ethylene oxide with aluminum chloride and/or aluminum hydroxychloride.

5 Claims, No Drawings

ALUMINA SYNTHESIS

BACKGROUND OF THE INVENTION

1. Field of the Invention

The present invention relates to a method for forming high surface area alumina materials that also have relatively large average pore diameters. More particularly, the present invention relates to a technique for forming high surface area, alumina compositions by heating alumina monohydrate, alumina trihydrate or mixtures thereof from 500° to at least 800°F in the presence of elemental halogen, preferably chlorine.

2. Description of the Prior Art

Alumina is a known article of commerce. High purity alumina is widely employed as the support or carrier in various catalyst compositions. Many different routes are employed for the preparation and/or purification of catalyst grade alumina. Prior art workers have also disclosed processes for treating alumina materials with various halogen containing reagents. For example, Estes et al in U.S. Pat. No. 3,549,718 disclosed the treatment of calcined alumina with a chloride activating agent. Suggitt et al in U.S. Pat. No. 3,689,434 teach the treatment of calcined alumina with chlorine or bromine. Wilson in U.S. Pat. No. 3,702,312 disclose the flourine treatment of crystalline aluminosilicate materials. Chlorination of uncalcined alumina has also been disclosed. Haensel in U.S. Pat. No. 2,479,110 and Cox in U.S. Pat. No. 2,642,384 describe processes for the addition of halogen to alumina prior to calcination. McCallister et al in U.S. Pat. No. 3,654,184 teach the addition of chloride salts to an alumina sol. Finally, Hayes et al in U.S. Pat. No. 3,702,293 disclose that halogen salts can be added to alumina either before or after a calcination operation.

SUMMARY OF THE INVENTION

In accordance with the present invention, it has been discovered that high surface area alumina materials that are particularly suited as catalyst supports or carriers can be prepared by heating an alumina material comprising alumina monohydrate, alumina trihydrate or mixtures thereof from below about 450°–500°F to at least 800°F in the presence of excess elemental halogen, preferably chlorine. The heat treatment of alumina materials in the presence of elemental halogen ($Cl_2$, $Br_2$, $F_2$ and $I_2$) should be conducted prior to the alumina materials being heated to a temperature above about 400°F in the absence of elemental halogen. Preferably, the alumina gel is not heated to above about 450°F in the absence of halogen. Furthermore, the alumina monohydrate and/or aluminum trihydrate starting materials should be derived from the aqueous phase reaction of ethylene oxide with aluminum chloride and/or aluminum hydroxychloride. The halogen treating operation of the present invention results in the formation of alumina compositions having surface areas materially greater than those exhibited by alumina materials obtained by the conventional calcination of alumina monohydrate or alumina trihydrate. Furthermore, the increase in surface area encountered by the halogen treatment of alumina materials derived from the reaction of ethylene oxide with aluminum chloride and/or aluminum hydroxychloride is not encountered when alumina monohydrate and/or alumina trihydrate compositions secured from other sources are used as the starting material.

The preparation of high purity alumina by reacting ethylene oxide with aluminum chloride and/or aluminum hydroxychloride contained in an aqueous solution has been disclosed in the prior art. For example, the patentees of U.S. Pat No. 2,317,803 disclose the formation of alumina/silica materials utilizing this general procedure. Typically, from 3.3 to 4.7, preferably from 4.0 to 4.5 moles of ethylene oxide are used per mole of HCl formed when the ethylene oxide is reacted with the aluminum chloride and/or aluminum hydroxychloride contained in aqueous or alkanol solution. Preferably, the reaction is carried out in water. Normally, the concentration of aluminum chloride in the solvent medium varies from 12 to 27 moles, preferably from 14 to 20 moles, of aluminum chloride or aluminum hydroxychloride per liter of solvent. The ethylene oxide/aluminum salt reaction is typically conducted at atmospheric pressure at temperatures varying from −50° to 100°F, preferably from 0 to 60°F. The crude alumina containing gel resulting from the aluminum salt/ethylene oxide reaction is thereafter washed with a lower alkanol, preferably isopropanol. As noted above, a lower alkanol can also be present in the original reaction mixture. The resulting alcohol-containing alumina gel is thereafter subjected, without prior calcination, to the treating process of the present invention to secure a high surface area alumina product. The halogen-treated alumina may be heated thereafter in the presence or absence of halogen to a temperature varying from 800° to 1,000°F to obtain a final alumina material.

According to the process of the present invention, the alumina monohydrate, alumina trihydrate or mixtures thereof generated by the aluminum salt/ethylene oxide reaction is treated to form high surface area alumina products. The halogen treating operation must be conducted prior to the alumina gel being heated to a temperature above about 450–500°F in the absence of elemental halogen. In brief, the treating process consists of contacting the raw, uncalcined alumina product halogen chlorine alone or in combination with a carrier gas at elevated temperatures. Desirably, the alumina material is heated from 500° to at least 800°F, preferably from 400°F to at least 900°F, in the presence of the halogen reagent. If desired, the temperature range through which the alumina material is heated in the presence of the halogen may range from room temperature up to about 1,250°F; however, it is only essential that the alumina material, when at a temperature in a range of from 450–500° to 800°F, be in contact with elemental chlorine.

It is important that excess halogen be employed in the treating operation. As used herein, the term "excess halogen" is meant to require that more halogen be present in the treating zone containing the alumina gel than will react with or be physically absorbed by the alumina material. In a commercial environment, the chlorine is generally admixed with a carrier gas such as air, nitrogen or helium in amounts up to about 1 volume percent halogen and the total mixture passed through a fixed bed of the alumina gel in amounts sufficient that chlorine is detected in the outlet gases from the reaction zone.

After the alumina gel has been heated from 450–500°F to at least 800°F in the presence of excess halogen, the treated alumina may be heated further to temperatures up to 1,250°F in the absence of elemental halogen. Similarly, when the alumina is being heated from the temperature of its formation up to about 450°–500°F, it need not be heated in the presence of elemental halogen. Normally, the alumina gel derived from the aluminum salt/ethylene oxide reaction is packed within a reaction zone and heated slowly over a period from 2 to 8, preferably from 2 to 4 hours from about room temperature up to at least 800°F generally up to at least about 1,000° –1,250°F. As stated previously, during the period when the alumina material is at a temperature of from about 450°–500°F to at least 800°F, it should be maintained in an atmosphere of elemental chlorine.

The alumina compositions prepared with the procedure of the present invention have many varied uses. The alumina materials are particularly effective catalyst supports. The alumina produced with the process of the present invention exhibits surface areas ranging from about 375 to 580 square meters per gram as determined by the BET method and pore volumes in the range of from 0.4 to about 1.5 cubic centimeters per gram. Typically, the average pore diameter (average pore diameter equal four times the pore volume (BET Method) divided by the surface area (BET Method)) of the alumina products of the present invention ranges from about 30 to 200 Angstroms. Furthermore, the alumina products typically contain greater than about 5 weight percent halogen; however, the halogen content of the alumina product may be reduced by methods known to those skilled in the art.

The alumina products produced by the method hereof are particularly effective supports for catalysts employed in hydroisomerization, hydroforming, hydrodesulfurization, hydrodenitrogenation and halogenation reactions. The finished catalysts are composed of the alumina support composited with one or more metals selected from Groups VI, VII and VIII of the Periodic Table. Examples of useful catalysts include platinum on alumina, platinum and rhenium on alumina, cobalt on alumina, cobalt and molybdenum on alumina, nickel and molybdenum on alumina, etc.

DESCRIPTION OF THE PREFERRED EMBODIMENTS

EXAMPLE 1

Alumina A was prepared by cooling an aqueous solution of 1,160 grams of $AlCl_3.6H_2O$ in 500 milliliters of water to a temperature less than about 30°F. To this aqueous solution was added 1,000 grams of ethylene oxide. During this addition, the solution was maintained at a temperature below about 35°F. The resulting alumina gel reaction product was permitted to age for four days. Thereafter, the gel was filtered to remove about 335 cubic centimeters of liquid by-product. The remaining gel was then washed with isopropanol and dried in air at 250°F. A portion of the alumina product was then heated to 1,000°F and another portion, after heating to 400°F in nitrogen, was contacted with a mixture of one volume percent chlorine in air while being heated to from about 400°F to 950°F. After reaching the temperature of 950°F, the alumina was held at this temperature for one hour. Sufficient air-chlorine reagent was employed to assure the presence of excess chlorine. The BET surface area of the chlorinetreated alumina was 502 square meters per gram. In contrast, the BET surface area of the untreated calcined alumina was only 319 square meters per gram.

EXAMPLE 2

Alumina B was prepared following the general procedure of Example 1 except that the crude alumina gel was permitted to age for 6 days prior to washing and drying. A portion of the resulting washed alumina gel was heated to a temperature of 1,000°F in air. A second portion was heated to a temperature of 450°F in a flow of nitrogen. Thereafter, the 450°F heated alumina was contacted with a mixture of one volume percent chlorine in air and the alumina gradually heated to a temperature of 950°F. The 950°F temperature level was maintained for 1 hour. Sufficient air/chlorine mixture was employed to assure the presence of excess chlorine. The chlorine-treated alumina product exhibited a BET surface area of about 474 square meters per gram as compared to a surface area of 347 square meters per gram for the conventionally calcined alumina.

EXAMPLE 3

Alumina C was prepared by dissolving 1,160 grams of $AlCl_3.6H_2O$ in 1,800 milliliters of methyl alcohol. This solution was cooled to a temperature of 20°F and was mixed with 690 grams of ethylene oxide. During the mixing of the reagents, the temperature of the reaction mixture was maintained below about 40°F. The resulting crude alumina gel was aged for 6 hours and filtered to remove 1,240 milliliters of liquid. Thereafter, the crude gel was washed with isopropyl alcohol and dried in air at 250°F. A portion of the alumina product was heated in air to a temperature of 1,000°F. A second portion of the alumina was heated to 450°F in nitrogen and thereafter contacted with a mixture of one volume percent chlorine in air while the temperature of the alumina was raised to 950°F. Excess chlorine reagent was employed. The resulting chlorine treated alumina exhibited a BET surface area of 355 square meters per gram versus a surface area of 282 square meters per gram for the conventionally calcined alumina.

EXAMPLE 4

Alumina D was prepared in a similar manner as Alumina C except that water was employed in the synthesis step instead of methyl alcohol. The crude alumina gel was aged and thereafter was contacted with one volume percent chlorine in air mixture while the alumina was heated to 950°F. The 950°F temperature level was held in the presence of the air/chlorine mixture for 1 hour. Excess chlorine was present in the reaction zone during the period of high temperature contacting. The final chlorine treated alumina exhibited a surface area of about 450 square meters per gram (BET Method) as compared to a surface area of about 223 square meters per gram (BET Method) for the conventionally calcined alumina.

EXAMPLE 5

Another alumina product was prepared in a similar manner as Alumina D except that the crude gel product was aged for three days prior to alcohol washing and drying in air. A portion of the air-dried alumina was heated to 450°F in a flow of nitrogen. Upon reaching 450°F, a gas mixture comprising one volume percent chlorine in air was passed over the alumina at 450°F until chlorine was detected in the outlet gases from the reaction zone. This product is referred to as Alumina E. A portion of Alumina E was then calcined in air to a temperature of 1,000°F. The resulting product is designated Alumina F. A second portion of Alumina E was heated to 1,000°F in the presence of a gas mixture comprising one volume percent chlorine in air. This material is designated Alumina G. A third portion of Alumina E was treated in the same manner as Alumina G except that the alumina material was held for an additional 90 minutes at 1,000°F in the presence of the chlorine/air mixture. This material is designated Alumina H. A portion of Alumina H was further treated by heating the previously heated alumina product to a temperature of 1,250°F and held in this temperature level for 1 hour. This contacting was conducted in the presence of the previously described air/chlorine mixture. This alumina material is designated as Alumina I. Surface area measurements (BET Method) were made on each of the described alumina products.

Alumina E possessed a BET surface area of about 344 square meters per gram. Alumina F, which was Alumina E further subjected to a high temperature calcination treatment, possessed a BET surface area of 332 square meters per gram which is very similar to the surface area of Alumina E. Alumina G and Alumina H, which were treated with chlorine up to a temperature of 1,000°F, exhibited surface areas (BET Method) of 521 square meters per gram respectively. These values are substantially higher than the 481 square meters per gram surface area exhibited by Alumina I, which was subjected to a halogen treatment terminating at 1,250°F.

EXAMPLE 6

A commercially available aluminum hydrate gel prepared by the hydrolysis of alkyl aluminum compounds (identified as Catapol-S) was heated in nitrogen to a temperature of 450°F and was maintained at that temperature while contacted with a gas mixture comprising one volume percent chlorine in air. The air/chlorine treatment was carried out until chlorine was detected in the outlet gases from the reaction zone. Air/chlorine contacting was continued as the temperature of the material was raised to 1,000°F. The temperature of the alumina was maintained at 1,000°F for ninety minutes in the presence of the chlorine/air mixture. A portion of the original aluminum hydrate gel was also calcined in air to 1,000°F. The chlorine-treated alumina exhibited a BET surface area of 200 square meters per gram. The material that was simply calcined in air to 1,000°F exhibited a surface area (BET Method) of 195 square meters per gram. This experiment demonstrates that the chlorine treatment operation of the present invention does not have a substantial impact on the surface area of alumina materials prepared by synthesis techniques not involving the reaction of ethylene oxide with an aluminum salt.

The physical properties of the aluminum materials discussed in Examples 1–6 are summarized in Table I hereof.

TABLE I

PHYSICAL PROPERTIES AND CHLORINE CONTENT OF THE TREATED AND UNTREATED ALUMINAS

| Alumina[1] | Calcined | | | | Halogen treated | | | |
|---|---|---|---|---|---|---|---|---|
| | Temp., °F | S.A. | P.V. | P.D. | Temp., °F | S.A. | P.V. | P.D. | Wt. %Cl |
| A | 1,000 | 319 | 2.34 | 293 | 400–950 | 502 | 1.3 | 104 | 5.15 |
| B | 1,000 | 347 | 2.22 | 256 | 450–950 | 474 | 2.06 | 174 | 4.63 |
| C | 1,000 | 282 | 0.49 | 70 | 450–950 | 355 | 0.39 | 44 | 5.19 |
| D | 1,000 | 223 | 0.65 | 117 | To 950 | 450 | 0.54 | 48 | 6.99 |
| E | | | | | 450 | 344 | 0.64 | 74 | |
| F | 1,000 | 332 | 0.88 | 106 | | | | | |
| G | | | | | 450–1,000 | 521 | 0.53 | 41 | — |
| H | | | | | 450–1,000 | 569 | 0.53 | 37 | 7.63 |
| I | | | | | 450–1,250 | 481 | 0.49 | 41 | — |
| Catapol-S | 1,000 | 195 | 0.42 | 86 | 450–1,000 | 200 | 0.55 | 110 | 1.61 |

[1] S.A., P.V. and P.D. denote respectively BET surface area, BET pore volume and average pore diameter ((4) (P.V.)/(S.A.)).

EXAMPLE 7

To illustrate the effectiveness of the alumina product of the present invention as a catalyst support, a cobalt-/molybdenum catalyst was prepared with Alumina A and subsequently tested for hydrodesulfurization activity. Specifically, Alumina A was impregnated with methyl alcohol solutions of cobalt acetate and phosphomolybdic acid to deposit 3.5 percent cobalt (CoO) and 12.0 percent molybdenum ($MoO_3$). This catalyst and a commercially available cobalt/molybdenum on alumina catalyst (alumina surface area of 250 square meters per gram (BET)) were tested for hydrodesulfurization rodesulfurization activity on a Tia Juana atmospheric residuum. The residuum material possessed an API gravity of 15.4°, contained 2.15 wt. % sulfur, 285 wppm vanadium, 45 wppm nickel and 14.5 wt. % asphaltenes.

The catalysts were sulfided prior to use. The hydrodesulfurization process was carried out at a temperature of 700°F and a hydrogen pressure of 1,000 psi and at a gas rate of 4,000 standard cubic feet of hydrogen per barrel of residuum material. The conventional cobalt catalyst was used at a space velocity of 0.64 weight parts of feed stock per hour per weight of catalyst (W/Hour/W). The catalyst based on Alumina A was used at a space velocity of 1.12 W/Hour/W. The product inspections resulting from the hydrodesulfurization test are set forth in Table II below.

TABLE II

HYDROPROCESSING OF TIA JUANA RESIDUUM

| Liquid Product Inspections | Conventional Catalyst | Alumina A Catalyst |
|---|---|---|
| Gravity, °API | 19.1 | 21.6 |
| Sulfur, Wt. % | 0.98 | 0.38 |
| Metals, PPM | | |
| Vanadium | 88 | 89 |
| Nickel | 19 | 15.5 |
| Asphaltenes, Wt. % | 5.5 | 4.2 |
| % Hydrodesulfurization | 55.4 | 82.2 |
| % Hydrodemetallization (V) | 70.0 | 66.9 |

The Table II data indicate that the catalyst prepared with the high surface area alumina material of the present invention is substantially more effective in respect to desulfurization activity and is at least equivalent in demetallization activity to a conventional cobalt-/molybdenum based catalyst. The results are especially surprising considering that the run conducted with the Alumina A catalyst was carried out at a space velocity of almost twice that used with the conventional catalyst. The higher API product gravity secured with a catalyst based on Alumina A is indicative of higher conversion and/or improved hydrogenation of feed aromatic materials.

What is claimed is:

1. A method for preparing an alumina having a surface area ranging from about 375 to 580 m²/gm (BET) which comprises reacting ethylene oxide with aluminum chloride, aluminum hydroxychloride or mixtures thereof to obtain a raw alumina product comprised of alumina monohydrate, alumina trihydrate or mixtures thereof, and heating said raw alumina, prior to calcination at temperatures in excess of 450°F, from 500°F to at least 800°F in the presence of excess elemental halogen.

2. The method of claim 1 wherein the halogen is chlorine.

3. The method of claim 2 wherein said heating is conducted from 450°F to at least 800°F.

4. The method of claim 2 wherein the product of the heating step is calcined at temperatures ranging from 800°F to 1000°F.

5. The method of claim 1 wherein said alumina product is the product of the reaction of ethylene oxide with aluminum chloride.

* * * * *